(12) United States Patent
Chau

(10) Patent No.: US 8,817,359 B2
(45) Date of Patent: Aug. 26, 2014

(54) IN-BAND SIGNALING IN OPTICAL CROSS-CONNECT SWITCH USING FREQUENCY MODULATION

(71) Applicant: Kelvin Chau, Pleasanton, CA (US)

(72) Inventor: Kelvin Chau, Pleasanton, CA (US)

(73) Assignee: Gilmmerglass Networks, Inc., Hayward, CA (US)

( * ) Notice: Subject to any disclaimer, the term of this patent is extended or adjusted under 35 U.S.C. 154(b) by 0 days.

(21) Appl. No.: 13/626,812

(22) Filed: Sep. 25, 2012

(65) Prior Publication Data

US 2013/0120826 A1    May 16, 2013

Related U.S. Application Data

(60) Provisional application No. 61/560,393, filed on Nov. 16, 2011.

(51) Int. Cl.
*G02B 26/00* (2006.01)
*H04Q 11/00* (2006.01)

(52) U.S. Cl.
CPC ...... *G02B 26/002* (2013.01); *H04Q 2011/0039* (2013.01); *H04Q 2011/003* (2013.01); *H04Q 11/0005* (2013.01)
USPC ............... 359/290; 359/291; 385/15; 385/16; 385/18

(58) Field of Classification Search
USPC .............. 359/290–295, 298, 618–623; 385/3, 385/14–18; 378/65
See application file for complete search history.

(56) References Cited

U.S. PATENT DOCUMENTS

| | | | |
|---|---|---|---|
| 6,539,142 B2 * | 3/2003 | Lemoff et al. | 385/18 |
| 6,549,691 B1 * | 4/2003 | Street et al. | 385/18 |
| 6,549,692 B1 * | 4/2003 | Harel et al. | 385/18 |
| 6,560,384 B1 * | 5/2003 | Helkey et al. | 385/18 |
| 6,567,574 B1 * | 5/2003 | Ma et al. | 385/16 |
| 6,694,072 B1 * | 2/2004 | Neukermans et al. | 385/18 |
| 6,738,539 B2 * | 5/2004 | Hagood et al. | 385/16 |
| 6,785,437 B2 * | 8/2004 | Hagood et al. | 385/16 |
| 7,263,253 B2 * | 8/2007 | Davis et al. | 385/18 |
| 7,362,930 B2 * | 4/2008 | Davis et al. | 385/18 |
| 2013/0107347 A1 * | 5/2013 | Chau | 359/290 |

* cited by examiner

*Primary Examiner* — Loha Ben
(74) *Attorney, Agent, or Firm* — Kilpatrick Townsend & Stockton LLP; Kenneth R. Allen

(57) ABSTRACT

In a multiple-axis free-space-coupled single-mode fiber-optic transmission system, such as an optical cross-connect switch, a method and apparatus are provided for the closed loop attenuation of optical beam power signals employed to align and cause dithering via MEMS mirrors which are manipulated to impose on the optical beam frequency modulation and, in particular, a time-varying set of induced mirror angles that yield a desired time history of optical power level that is modulated according to a digital code in the frequency modulation pattern.

11 Claims, 10 Drawing Sheets

IN-BAND SIGNALING IN OPTICAL CROSS-CONNECT SWITCH USING FREQUENCY MODULATION

CROSS-REFERENCES TO RELATED APPLICATIONS

The present application claims benefit under 35 USC 119(e) of U.S. provisional Application No. 61/560,393, filed on Nov. 16, 2011, entitled "IN-BAND SIGNALING IN OPTICAL CROSS-CONNECT SWITCH USING FREQUENCY MODULATION," the content of which is incorporated herein by reference in its entirety.

BACKGROUND OF THE INVENTION

The invention relates to in-band signaling, and in particular to optical cross-connect switches providing an in-band signaling capability. The invention finds application to microelectromechanical systems (MEMS), but it is not so limited.

The optical cross-connect switch promises to become a key element of fiber-optic networks. Steering elements in the optical switch are used to direct beams of light from input fibers to the desired output fibers (or equivalently, optical waveguides). The amount of optical power coupled through a given connection is a function of a) the amount of power present in the input fiber, b) insertion losses at the fibers, lenses, and mirrors, c) coupling loss due to mode radii mismatches and longitudinal errors, and d) coupling loss due to errors in beam alignment as effected by the steering elements.

Previous optical switches have not capitalized on the loss due to errors in beam alignment as a means of intentionally modulating the power emerging from the output fibers en route to certain other elements of the optical network. A fraction of signal power can be utilized to generate a set of commands to signal other elements downstream along the optical path. This command set can be encoded as a sequence of events expressed by different optical power levels, discrete frequencies, or their combination. Such in-band signals travel along the same optical channels available for data. One representative use is to optically add a key to the data channel through the "send" optical switch allowing the "receive" optical switch to use the key to determine what optical connection should be made for the incoming data. In an all-optical network employing optical switches in conjunction with power-level-sensitive elements, such as optical amplifiers and multi-wavelength systems, the signaling function currently executed using dedicated elements can potentially be absorbed by the optical switch, thereby minimizing or eliminating the need for expensive post-switch signaling sources.

In-band signaling techniques can be implemented with a single mirror actuated with at least one actuator used as a beam-steering element; the power loss is governed by the mirror deflecting angle in at least one axis away from a set of angles that maximize coupling.

In prior art, such as found in U.S. Pat. Nos. 6,711,340; 6,484,114 and 6,556,285 of the assignee of the present invention Glimmerglass Networks, Inc., techniques were disclosed for optical beam alignment of cross-connect switches and similar optical devices using a constant amplitude dithering technique. The subject matter of these patents is incorporated by reference herein for all purposes. Although the power-loss mechanism is similar to the loss mechanism employed in the present context, the prior art is not applicable to the general case of using two or more steering elements, nor to the specific case of an in-operation optical switch utilizing prescribed motions of the steering elements that prohibit the methods of the prior patents. The need exists for a technique for optical modulation that can be effected using the steering elements of an in-operation optical switch without deleterious impact on the switching functions.

It has been shown in U.S. Pat. Nos. 6,556,285 and 6,484,114 that four coordinate errors can be detected using synchronous detection. The four orthogonal oscillations, dithers, of the output errors are produced through associated motion of the mirrors as defined by a kinematic mapping between an actuator space and a coupling space. Each mirror in the optical path is actuated with a pair of orthogonal, in the x and y directions, angular displacement commands. These imposed angular displacement commands that effect dither are in addition to the nominal mirror steering commands that center the beams on the mirrors. The four unknown alignment errors are detected by demodulating the logarithm of the power with the four time-orthogonal dither mode variable signals and averaging over the minimum time period that the four dither cycles repeat. It has been shown that the effects of the four dithers on the logarithm of the power are separable and proportional to the alignment errors that can be individually minimized. In the prior art, the objective has been to maintain a constant power at the output fiber with minimal optical loss of a connection using dithering. In contrasts, as will be explained, an object of the present invention is to excite an in-band signal, or a modulated signal with unique frequency signatures.

The need exists for an in-band signaling technique for optical modulation that can be effected using the steering elements of an in-operation optical switch without deleterious impact on the switching functions and which is robust in the presence of noise and variations of in-line optical power.

SUMMARY

According to the invention, in a multiple-axis free-space-coupled single-mode fiber-optic transmission system, such as an optical cross-connect switch, a method and apparatus are provided for the closed loop attenuation of optical beam power signals employed to align and cause dithering via MEMS mirrors which are manipulated to impose an additional signal on the optical beam frequency modulation; in particular a time-varying set of induced mirror angles that yield a desired time history of optical power levels that are modulated according to a digital code in the frequency modulation pattern. The present invention includes methods to excite variable frequency modulated signals into the optical data channel while maintaining a sufficient alignment for optical coupling. The controlled time sequence expressed as a time-varying optical power level can be used for in-band signaling along the same optical channels available for conventional optical data. The modulated signal is conveyed through the cross-connect switch and is useful for example in control and command of the cross-connect switch.

In a specific embodiment involving two tip-tilt mirrors employed to couple optical power from an input fiber to an output fiber, the four mirror axes are actuated in such a way as to produce a time-varying set of induced mirror angles that yield a desired time history of optical power levels. The controlled time sequence is expressed as a time-varying optical signal of discrete frequencies that can be used for in-band signaling. Such continuous or burst signals travel along the same optical channels available for data conveyed through the fibers.

The technique can be used simultaneously with compatible alignment-detection techniques that ignore the frequency component and infer optical alignment through observation of signals at the frequencies of induced motions, known as dithers. The theoretical basis, as presented here, for four-axis variable speed attenuation is sufficient for the general case. Therefore, the disclosure is to be understood to address the cases for applications of more or fewer than four axes with a plurality of steering elements in the optical path.

The invention will be better understood by reference to the following detailed description in connection with the accompanying drawings.

DETAILED DESCRIPTION OF THE INVENTION

Free-Space Coupled Fiber Optic Switch Using MEMS

Figure 1:
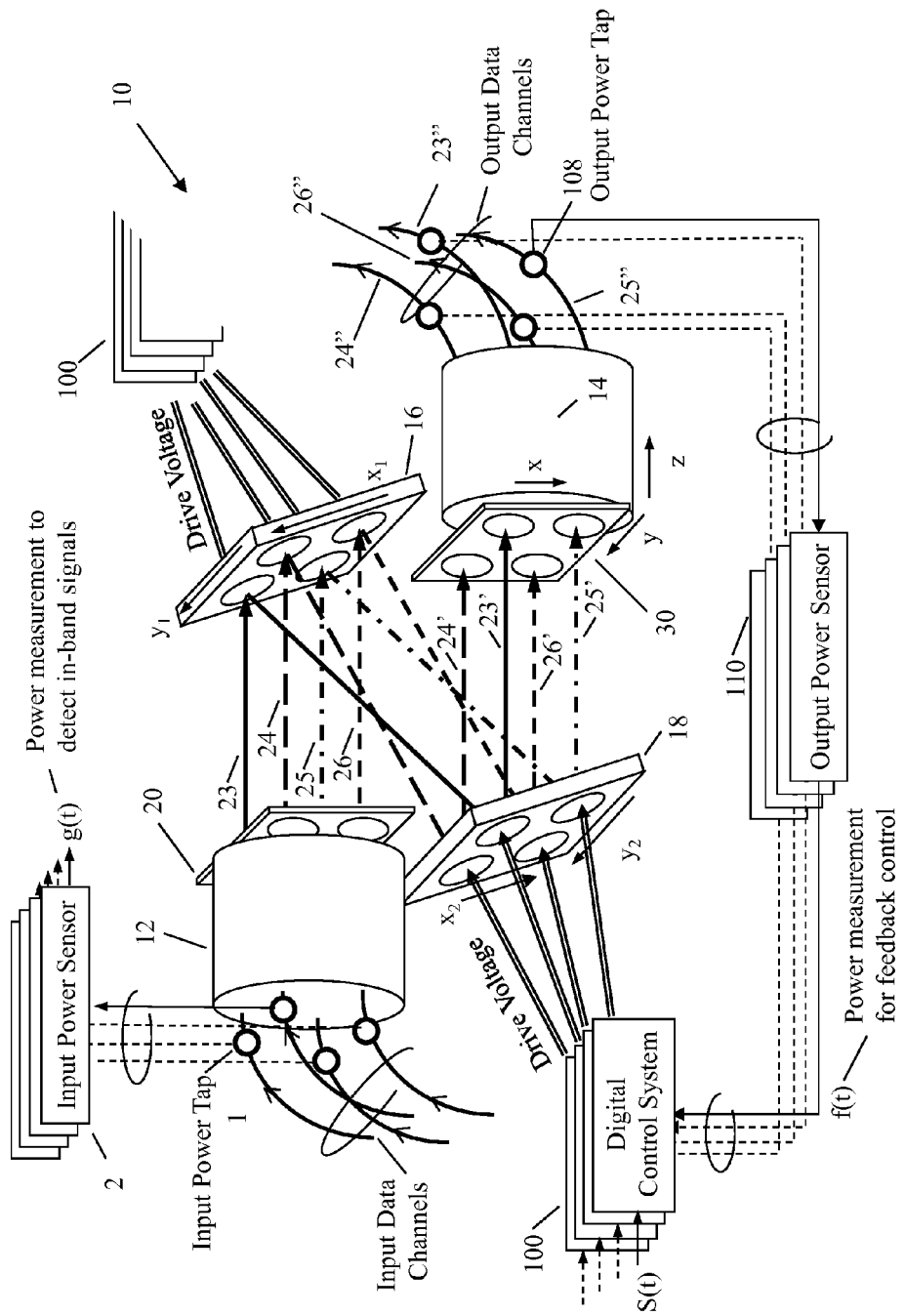
FIG. 1 is a perspective view of a three-dimensional optical switch showing a four port MEMS mirror array in which the invention is implemented, with a general schematic of an external controller and detection circuit for one channel.

Referring to FIG. 1, there is shown an example of a four-port MEMS mirror array fiber-optic cross-connect switch 10 in which the present invention may be implemented. The function of the fiber-optic switch 10 is to produce desired free-space couplings between the input fibers, in a first fiber array 12, and output fibers, in a second fiber array 14, via two-axis steering mirrors on a first mirror array 16 and a second mirror array 18. In the embodiment illustrating the invention, the optical path is unidirectional between input fibers and output fibers. Laser beams emanating from the input fiber array 12 are substantially collimated using a first lens array 20 confronting the first fiber array 12. Mirrors on the first or input mirror array 16 steer collimated beams 23, 24, 25, 26 from the first lens array 20 toward the appropriate mirrors on the second or output mirror array 18. The mirrors on the output mirror array 18 steer their incident beams into the corresponding lenses on a second or output lens array 30 as redirected beams 24', 24', 25', and 26'. The output lenses of the second lens array 30 produce converging beams necessary for coupling power into the output fibers 23", 24", 25" and 26" of the second fiber array 14. FIG. 1 shows input power tap 1 and sensor 2 and output power tap 108 and sensor 110. They are utilized to detect the optical power at each input and output fibers. Input power sensor is used to extract the in-band signals, g(t), off the optical data channel from the network system upstream. The signal, g(t), is used to affect the local system for specific actions. Output power sensor is used to interpret the alignment errors in order to supply continuous adjustment to the control voltages of both input and output mirrors. In FIG. 1, S(t) is expressed as an in-band signal generated locally and is intended for the system downstream. The digital control system 100 in FIG. 1 receives S(t) that affects the movement of a selected mirror in the second MEMS array 18 in x and y, while still providing to the selected mirror in array 18 a steering signal to select an output position at the lens array 30 independently. The power signal, f(t), extracted at the output can be shown as frequency modulated signals that originated as S(t), as hereinafter further explained.

Output Beam Alignment Geometry

Figure 2:
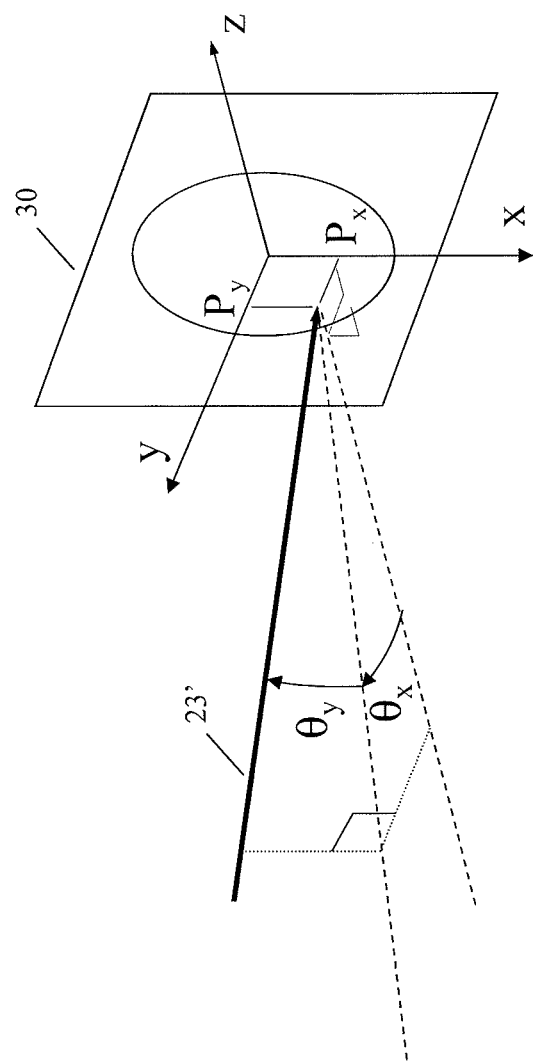
FIG. 2 is a schematic of a beam impinging on an output lens to illustrate beam alignment errors as used in the present invention.

Referring to FIG. 2, there is shown a diagram defining the alignment of an output beam relative to its output lens/fiber port in accordance with the invention. This technique may be applied in a variety of geometries, only one of which is that of FIG. 1. The axes "x", "y", and "z" define an "output" frame. The axis z is defined as the optical axis of the particular lens/fiber port (which may vary across the array of lens/fiber ports), and the perpendicular axes x and y are in the plane perpendicular to z. The beam intersects the output x-y plane at the linear displacements $P_x$ and $P_y$ in x and y, respectively. The two angles $\theta_x$ and $\theta_y$ define the orientation of the beam in the output x-y-z frame. With $\theta_x$ and $\theta_y$ equal to zero, the beam is parallel to the z axis. $\theta_x$ and $\theta_y$ are the rotations of the beam in the x and y directions, respectively, where a small-angle approximation, valid for the purpose of analyzing optical coupling, eliminates the need to define the order of the rotations. To clarify the sense of the rotations, the small-angle approximation for the unit vector in the direction of the beam expressed in the output frame is given by:

$$\alpha = \frac{f}{\omega_0}\theta_x,$$

Gaussian Power Coupling

Assuming that longitudinal misalignments are zero and that the beam is matched to the mode field radius of the output fiber, the total coupled power $P_{out}$, a scalar quantity measured at the output fiber, can be approximated in a Gaussian form in terms of an input power $P_{in}$ and four normalized beam alignment errors:

$$P_{out}=P_{in}e^{-(\alpha^2+\beta^2+\rho^2+\sigma^2)}, \quad (1)$$

where $P_{in}$ is the optical power before loss due to alignment errors, and the four normalized errors $\alpha$, $\beta$, $\rho$, and $\sigma$ are given by:

$$\alpha = \frac{f}{w_0}\theta_x,$$

$$\beta = \frac{f}{w_0}\theta_y,$$

$$\rho = \frac{n_{gap}\pi w_0}{\lambda f}(P_x - f\theta_y), \text{ and}$$

$$\sigma = \frac{n_{gap}\pi w_0}{\lambda f}(P_y + f\theta_x),$$

where:
f is the lens focal length,
$w_0$ is the beam radius at $1/e^2$ power density,
$\lambda$ is the laser wavelength, and
$n_{gap}$ is the index of refraction of the medium in the lens/fiber gap.

As discussed previously, the four normalized coordinate errors in angles $\alpha$ and $\beta$, and positions $P_x$ and $P_y$ are detected using synchronous detection. The detection process is explained as follows for the simplified case of a scalar normalized error x. The coupled output power is given in Gaussian form by:

$$P_{out} = P_{in} e^{-x^2},$$

where x(t) at time t is the sum of the unknown error $x_u$ and the known sinusoidal dither component $x_d(t)$ at frequency $\omega_d$:

$$x = x_u + x_d. \quad (2)$$

The logarithm of the power $P_{out}$ is given by:

$$\log(P_{out}) = \log(P_{in}) - x^2.$$

Since the quantity $x^2$ is given by:

$$x^2 = (x_u + x_d)^2$$
$$= x_u^2 + 2x_u x_d + x_d^2,$$

the log of the power is given by:

$$\log(P_{out}) = \log(P_{in}) - (x_u^2 + 2x_u x_d + x_d^2). \quad (3)$$

Constant-Power Dithering

In the case of a MEMS fiber-optic switch for which the coupled power is Gaussian in the four normalized alignment errors, quadrature dithering of the beam alignments, sine and cosine signals at a given frequency, produces a constant coupled power when the alignment errors, ignoring the dither component, are zero and the model parameters of the system are properly tuned.

To resolve mathematically the unknown alignment errors from 4-axis, $(Xu_{\theta x}, Xu_{\theta y}, Xu_{Px}, Xu_{Py})$ by, it can be shown that the orthogonal dithers, $x_d$, from equation 2 to be expressed as $A_\theta \sin(\omega_\theta t), B_\theta \cos(\omega_\theta t), A_P \sin(\omega_P t)$ and $B_P \cos(\omega_P t)$ added to the existing alignment errors of 4 axes, resulting the following:

$$X_{\theta x} = Xu_{\theta x} + A_\theta \sin(\omega_\theta t)$$

$$X_{\theta y} = Xu_{\theta y} + B_\theta \cos(\omega_\theta t)$$

$$X_{Px} = Xu_{Px} + A_P \sin(\omega_\theta t)$$

$$X_{Py} = Xu_{Py} + B_P \cos(\omega_\theta t)$$

where $\omega_\theta$ and $\omega_P$ are dithering frequencies, and $A_\theta, B_\theta, A_P$ and $B_P$ are four dither amplitudes that are "known" misalignment and will constitute small optical losses. $A_\theta, B_\theta, A_P$ and $B_P$ are calibration parameters that are determined and scaled by controlled bias voltages. The four unknown alignment errors, $Xu_{\theta x}, Xu_{\theta y}, Xu_{Px}, Xu_{Py}$, can be detected by demodulating the logarithm of the power with the four time-orthogonal dither mode variable signals and averaging over the minimum time period $(T=2\pi/\omega_o)$.

Figure 3:
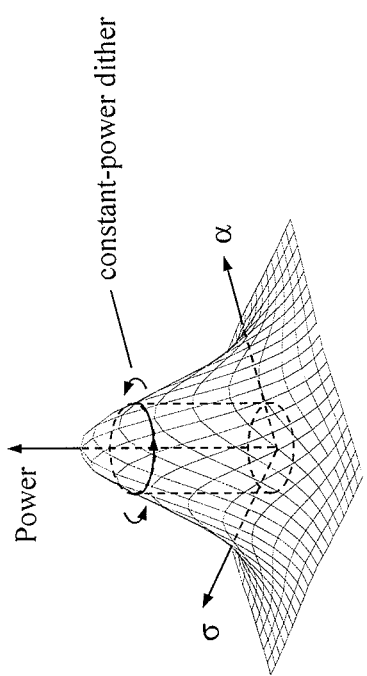
FIG. 3 is a three dimensional graph illustrating constant power dithering.

Mathematically, it can be represented as follows:

$$X_{\theta x} = \text{MoveAvgFilt}(X_{\theta x}(t) * \sin(\omega_\theta t))$$

$$X_{\theta y} = \text{MoveAvgFilt}(X_{\theta y}(t) * \cos(\omega_\theta t))$$

$$X_{Px} = \text{MoveAvgFilt}(X_{Px}(t) * \sin(\omega_P t))$$

$$X_{Py} = \text{MoveAvgFilt}(X_{Py}(t) * \cos(\omega_P t))$$

where MoveAvgFilt(g(t)) is defined as $1/T \int g(t) \, dt$ over a period from t to t+T. To zero out other terms except the alignment errors in the equation 3, $\omega_\theta$ and $\omega_P$ are necessary to be the harmonics of $\omega_\theta$. For example, $\omega_\theta = 2\omega_o$ and $\omega_P = 3\omega_o$. It can be shown that these unknown alignment errors, $Xu_{\theta x}, Xu_{\theta y}, Xu_{Px}, Xu_{Py}$, can be are separable, individually minimized and corrected through feedback. FIG. 3 illustrates for two of the four axes, $\sigma$ and $\alpha$, the concept of using quadrature dithering to provide a constant output power when the coupled power is Gaussian in the two alignment errors shown.

When the alignment errors, ignoring the dither component, are zero, as in FIG. 3, the sine and cosine dithers at the given frequency, whether above or below the natural resonance of the device, produce a circular trajectory in the two alignment errors. Since the sum of the squares of these two alignment errors is constant, due to the sine and cosine dithering, the result, as dictated by Equation 1, is a constant attenuated coupled power even though the individual injected errors from dithering are changing. If the other two dithers are also in quadrature form, these dithers will contribute a second constant loss term, such that the overall attenuation level due to the four dithers is constant.

According to the invention, S(t) in FIG. 1 controls the coupled power by the control of beam alignment relative to a nominal optical axis. There are various techniques whereby the coupled power can be attenuated. These techniques include applying a DC offset to the beam steering mechanism consisting of a plurality of beam steering elements, for instance, through the application of one or more bias command signals. In addition, these techniques include the application of various types of multiple time varying signals that are selected to produce a constant power output. These techniques include applying periodic signals to the beam steering mechanism which produce beam alignment characteristics that are complementary to one another, applying harmonically related signals which produce the desired constant attenuation, applying a pair of sinusoidal signals which produce beam alignment characteristics that are in phase quadrature, or applying pairs of sinusoidal signals which are paired to produce beam alignment characteristics in phase quadrature where the signals may or may not be at different frequencies. These last two techniques will be referred to as dithering-type techniques. Combinations of DC offset and various types of time-varying signals can also be employed to affect attenuation control. As explained hereinafter as an example of the application of these principles of attenuation by controlled misalignment, coupled power is readily controlled by scaling the relative amplitude and phase delay of excitation signals injected into the plant. It is important to bring attention to the fact that these techniques can be used in a control system with feedback to regulate attenuation level, or in an open-loop system with the application of excitation signals based on off-line criteria.

Figure 4:
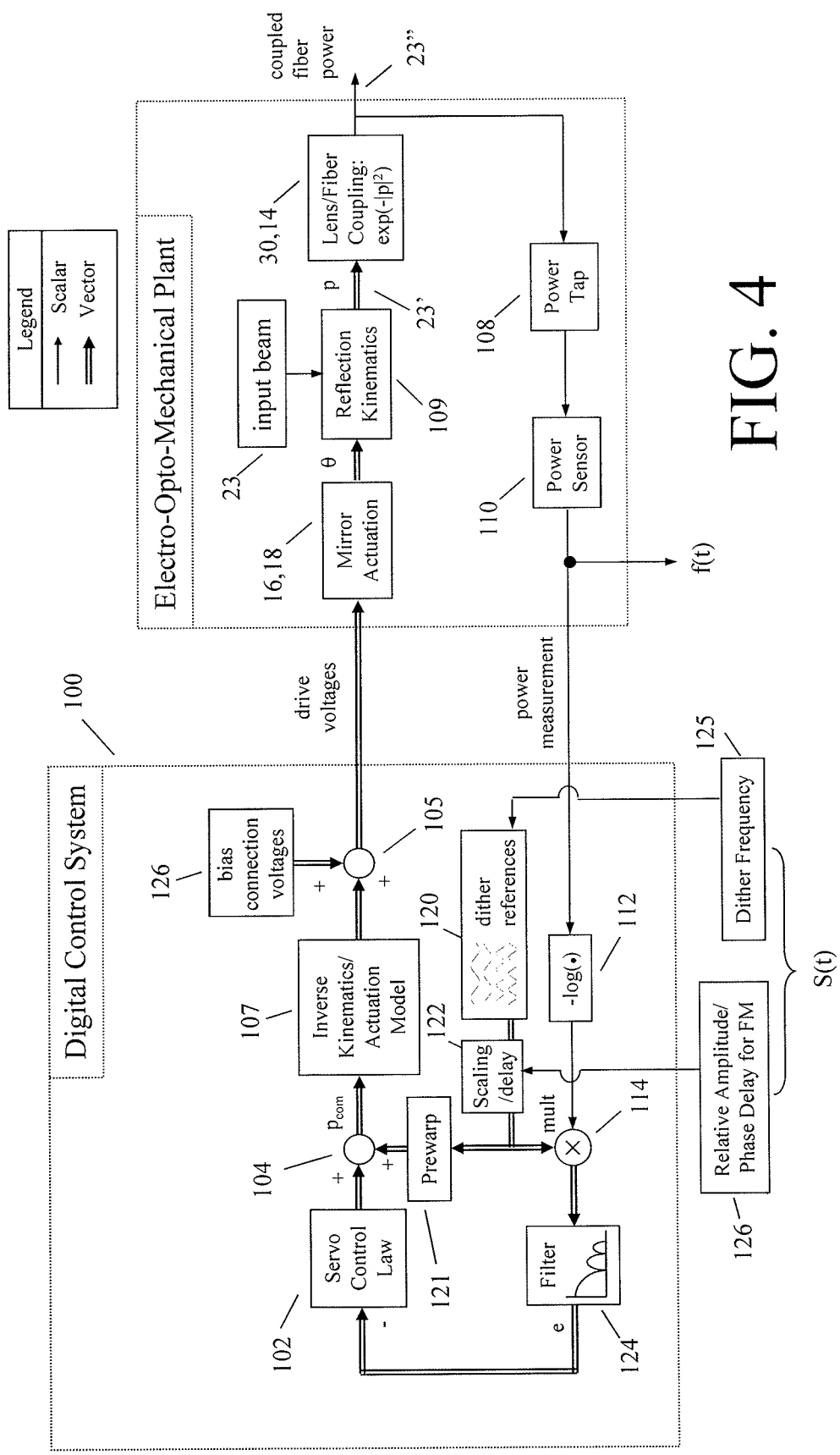
FIG. 4 is a schematic diagram of a control system where the relative amplitudes and delay between dithers can be changed to generate variable frequency signal according to the invention.

An example follows for the case of a plant incorporating a lens/fiber coupling element for which the power coupling is Gaussian in a set of normalized alignment errors. FIG. 4 is a schematic diagram of a control system 100. Of note, as part of this control system, a set of dither references 120 is multiplied by a scale factor or delay factor 122, expressed as S(t), to affect their relative amplitude or phase delay to generate a set of frequency modulated signals that constitute commanded values at the output fiber. These parameters, dither reference, scale factor and delay are externally defined and can be varied while making the optical connection between input and output mirrors independent of the operation to correct alignment errors. This invention, as explained herein below, is to incorporate these parameters into dither signals, so a set of actuator excitation signals can be produced to control the optical beam to move in a manner that frequency modulated signals can be generated at the output fiber.

Frequency Modulation

Expanding on Equation 3 on 2 axes, the total coupled power P at the output fiber can be approximated from the total power $P_{max}$ in a Gaussian form with the two beam alignment errors in the coupling space as follows:

$$\log P = \log P_{max} - Xu_{\theta x}^2 - 2A\sin(\omega_\theta t) Xu_{\theta y} - A^2\sin^2(\omega_\theta t) - Xu_{\theta y}^2 - 2B\cos(\omega_\theta t) Xu_{\theta y} - B^2\cos^2(\omega_\theta t).$$

This characteristic equation governs the relationship of detected power and the control of two orthogonal axes with a single dithering frequency, $\omega_\theta/(2\pi)$, where a sine signal with amplitude A is injected into $Xu_{\theta x}$ and a cosine signal with amplitude B is injected into $Xu_{\theta y}$, where $Xu_{\theta x}$ and $Xu_{\theta y}$ are alignment errors which need to be corrected.

To yield constant output power at alignment, the amplitudes A and B of the dithers are made identical, i.e., A=B, in the coupling space. When errors $Xu_{\theta x}$ and $Xu_{\theta y}$ are zero, the sine and cosine dithering in the two axes results in the following:

$$\log P = \log P_{max} - A^2.$$

Figure 5:
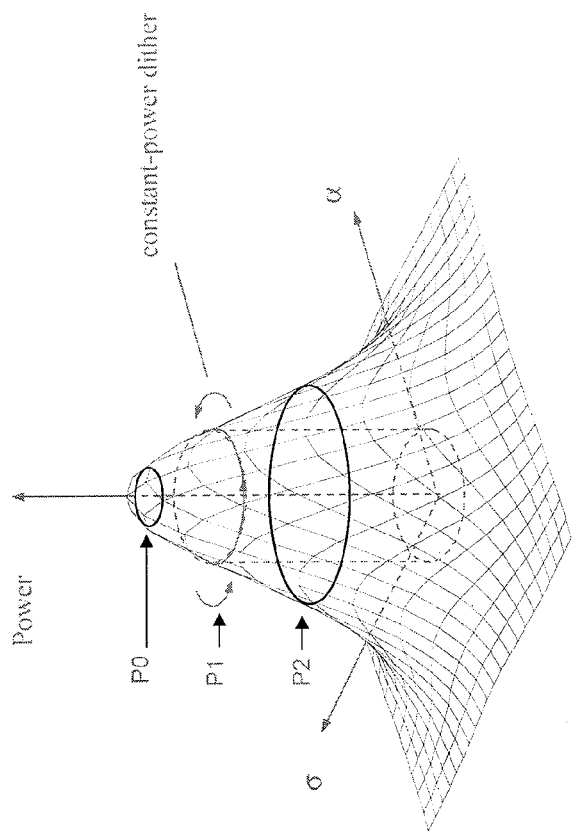
FIG. 5 is a three-dimensional graph illustrating dither at three different A values, consisting of a sine signal with amplitude A injected into a single axis cosine signal with amplitude B, where A is equal to B.

In this equation, the response in power coupled through the system is constant. As shown in FIG. 5, at three different values of A, the sine and cosine dithering in the two axes result in a constant log P drop of $A^2$.

When A is not equal to B, the coupling power will vary periodically with time because the distance that the dithering beam is away from the optical center is no longer a constant. When errors $Xu_{\theta x}$ and $Xu_{\theta y}$ are zero, the sine and cosine dithering in the two axes results in the following:

$$\log P = \log P_{max} - A^2 \sin^2(\omega_\theta t) - B^2 \cos^2(\omega_\theta t)$$
$$= \log P_{max} - (A^2 + B^2)/2 - (A^2 - B^2)\cos(2\omega_\theta t)/2$$

Figure 6A:
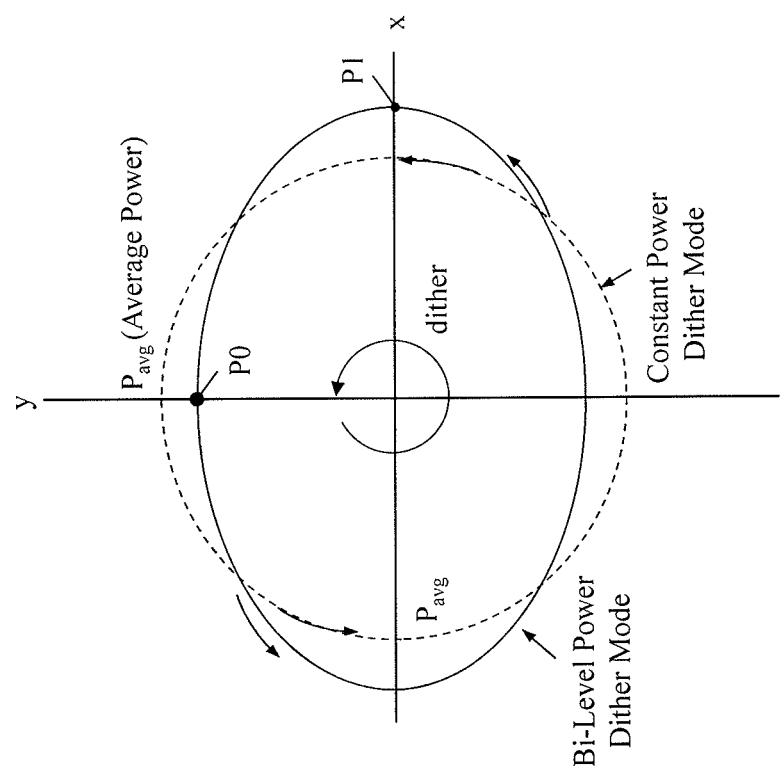
FIG. 6A is a graph illustrating the optical beam to dither about the center where the sine signal with amplitude A is injected into a first axis and the cosine signal with amplitude B is injected into a second, where A is not equal to B.
Figure 6B:
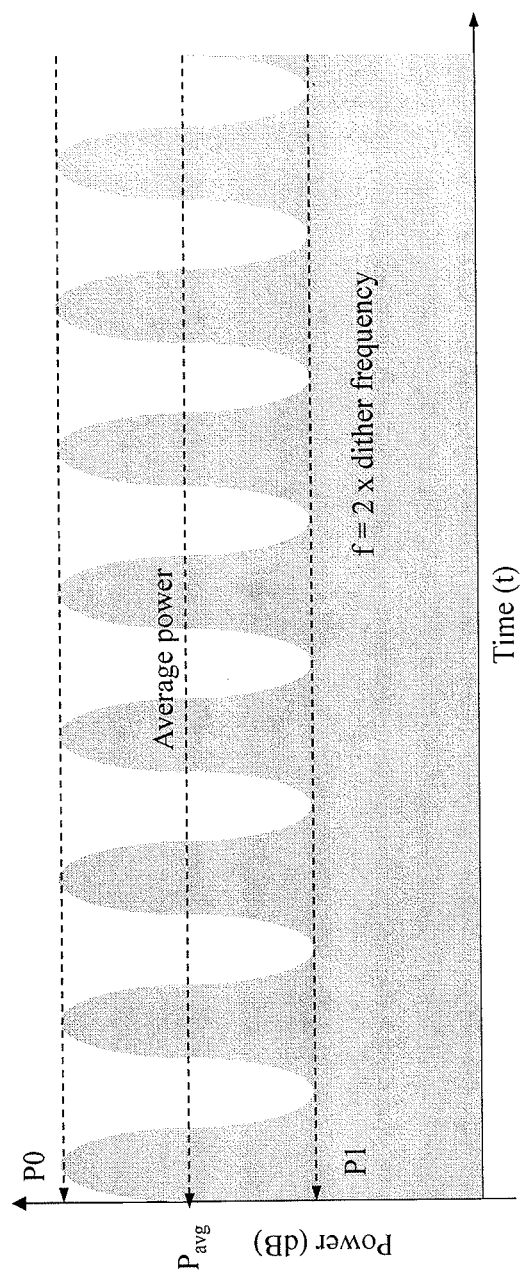
FIG. 6B is a time vs. amplitude graph illustrating modulation between two power levels as depicted in FIG. 6A, over several cycles.

According to the invention, to excite a frequency modulation signal from a constant power dither mode, the values A and B are set unequal. From this equation, the power coupled through the system varies at the rate of two times the applied dither, $\cos(2\omega_\theta t)$, with the modulation amplitude proportional to $A^2 - B^2$. FIG. 6A graphically illustrates the dithering beam about the optical axis at two non-equal distances when the alignment errors equal zero. Shown in FIG. 6B is the corresponding power in time at the output fiber rippling at the frequency of two times the applied dithering. $P_0$ and $P_1$ are the maximum and minimum power levels detected at the output, and $P_{avg}$ is the average power that can be used as the nominal power value as the system is operated in constant power dither mode.

For two-mirror systems, two dithers at frequencies $\omega_\theta$ and $\omega_P$, are used for solving four alignment errors. They are independent and their dither amplitudes of cosine or sine can be separately set to produce the modulations at either $2\omega_\theta$ or $2\omega_P$. The modulation depth, $A^2 - B^2$, can also be predetermined by their relative amplitudes of four oscillations, $\cos(\omega_\theta t)$, $\sin(\omega_\theta t)$, $\cos(\omega_P t)$, and $\sin(\omega_P t)$ as a set of scaling factors in calibration. For example, to excite a frequency modulated signal from the constant power mode, the relative amplitude, A/B, of a corresponding dither pair will need to change from one to a non-one value.

To create a bi-value coding function such as $G(n\Delta t)=[0\ 0\ 0\ 1\ 1\ 1\ 0\ 1\ 0\ 1]$, where $\Delta t$ is the time interval between code symbols and n=0, 1, 2, ... n, the binary sequence can be represented by alternating two frequencies, $2\omega_\theta$ and $2\omega_P$, resulting from their change in corresponding dither amplitude offset in time, where $2\omega_P$ represents "1" and $2\omega_P$ represents "0". To create a multi-value coding function, the actual dither frequency can also be changed in time in addition to the relative dither amplitude change, as long as the ratio relationship among the averaging frequency, $\omega_o$, and two dither frequencies, $\omega_\theta$, $\omega_P$, remains constant. Let say $\omega_o$, $\omega_\theta$, and $\omega_P$ or ($2\pi f_o$, $2\pi f_\theta$, $2\pi f_P$) are in the ratio of 1:2:3, respectively, then ($f_o$, $f_\theta$, $f_P$) can be set at (500 Hz, 1000 Hz, 1500 Hz) or (520 Hz, 1040 Hz, 1560 Hz) or other sets with the same ratio. In this example, the four resulting bases, 2000 Hz, 2080 Hz, 3000 Hz, and 3120 Hz, are available at different times for coding modulation.

Another method to excite a frequency modulation signal from a constant power dither mode is to add a constant phase (time) delay between cosine and sine dither in the two axes. It leads to the same effect even when their dither amplitudes are equal, A=B. With the phase delay, $\theta_d$, between sine and cosine dithering injected when $Xu_{\theta x}$ and $Xu_{\theta y}$ are equal to zero, logP can be expressed as follows:

$$\log P = \log P_{max} - A^2\sin^2(\omega_\theta t) - A^2\cos^2(\omega_\theta t + \phi_d)$$
$$= \log P_{max} - A^2\sin^2(\theta - \phi_d/2) - k_\theta A^2\cos^2(\theta + \phi_d/2)$$
$$= \log P_{max} - A^2[1 - \sin(\phi_d)\sin(2\theta)]$$
$$\theta = \omega_\theta t + \phi_d/2.$$

Figure 7:
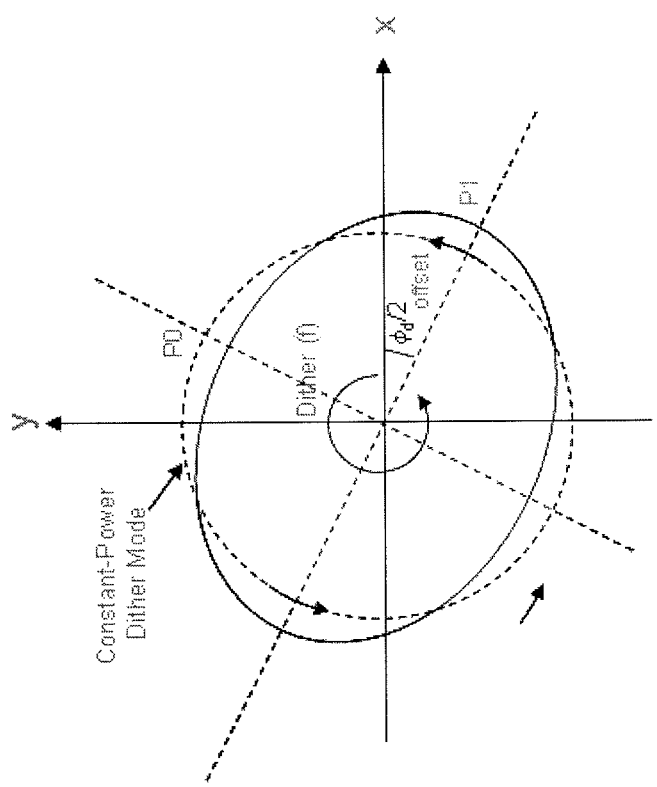
FIG. 7 is a graph illustrating the optical beam to dither about the center where the phase delay between sine and cosine dither is not zero.

In this equation, the power coupled through the system varies at the rate of two times the applied dither, $\sin(2\omega_\theta t + \phi_d)$, with the modulation amplitude proportional to $\sin(\phi_d)$. FIG. 7 shows graphically the dithering beam about the optical axis at two non-equal distances tilted at an angle of $\phi_d/2$ when the alignment errors are zero. The power response in time is similar to FIG. 6B.

In summary, the objective of the present invention is to excite in-band signal with unique frequency signatures. This is done by orbiting the beam elliptically about the optical center. With unequal distances at two orthogonal axes, the coupling power at the output can be modulated at the frequency twice of the dither. There are two methods to make the optical beam trajectory elliptical about the optical center when the alignment errors=0 (excluding the known misalignment from dithering).

a. Set A and B (relative dither amplitude) to be unequal.
  b. Set a constant phase (time) delay between sine and cosine dither to be of the same frequency.

These two frequency modulation methods require a constant offset to be injected into either the amplitude of the cosine or the sine dither, or the phase delay between the cosine and the sine dither. These offset values set the modulation depth that can be predetermined in calibration and switched on or off according to the coding requirements. The accuracy of modulation depth is not necessary, provided the power change (AC) is strong enough for the detection circuit to pick up the frequency component. One great advantage of frequency modulation is its immunity to power variation. By offsetting the center of dithering from the optical center of the coupling fiber (e.g., shifting the optical center in any direction from the center shown in FIG. 6A or FIG. 7), another mode of frequency modulation can be achieved. This can be effected by controlled misalignment of the optical beam relative to the target output fiber. The resultant modulated frequency will be higher than that of the dithering frequency, namely four times that of the dithering frequency.

Figure 8:
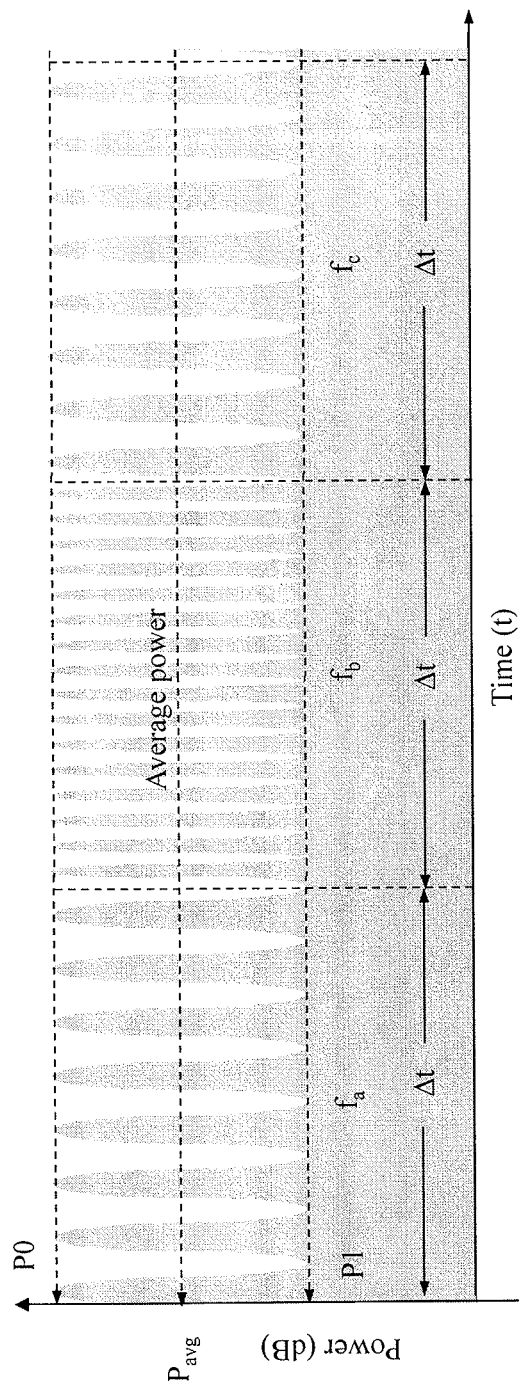
FIG. 8 is a graph illustrating the modulation with three frequencies available for coding.
Figure 9:
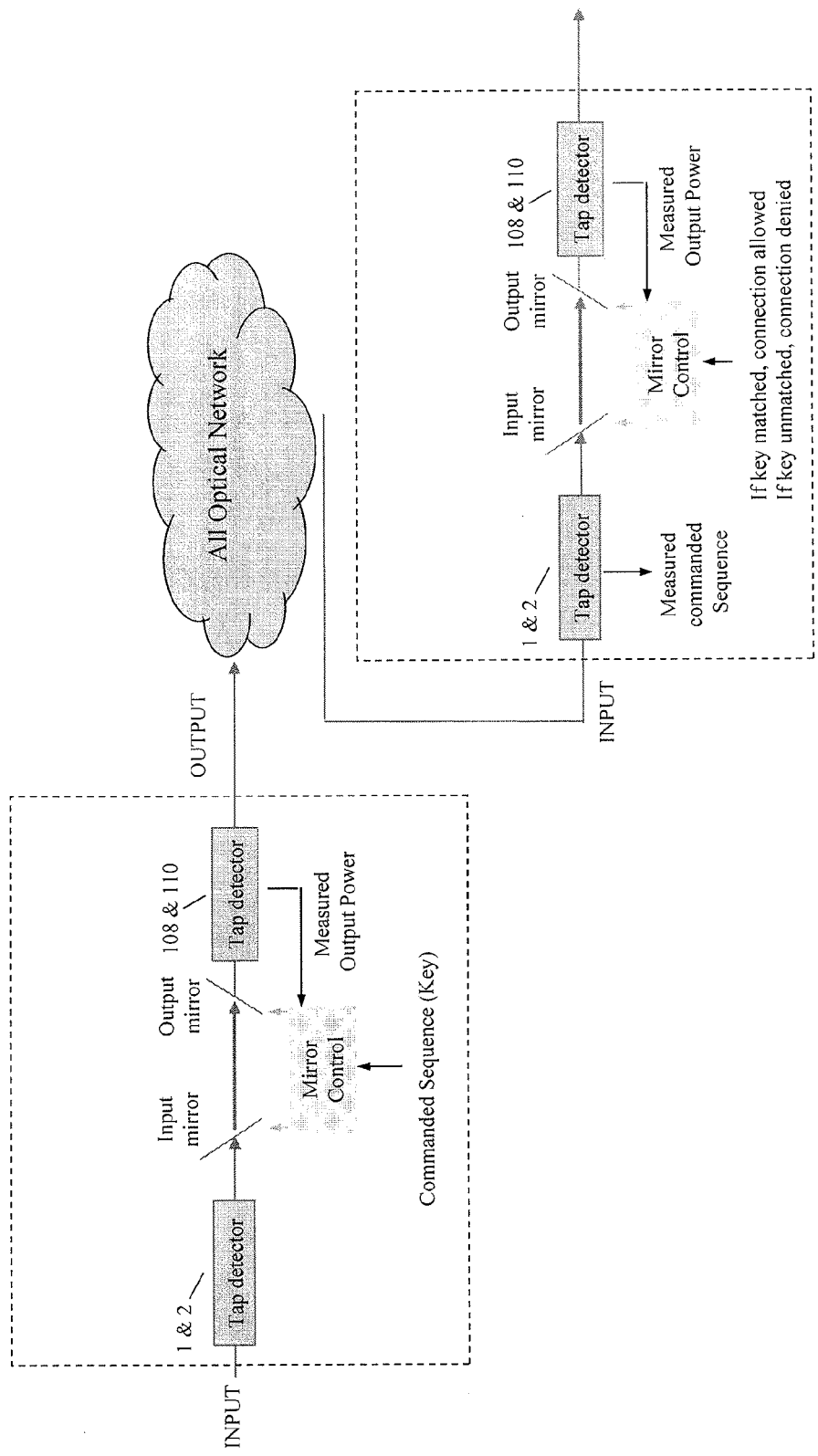
FIG. 9 is a schematic diagram to illustrate an application of an optical key using in-band signaling.

It has been shown that the modulated frequency is directly related to the dither frequency. Therefore, the modulated frequency can be controlled by changing the dither frequency under the stated condition without affecting the alignment algorithm, as long as the ratio relationship among $f_1 : f_2 : f_3$ is kept constant. The invention is presently implemented using sine and cosine signals at two frequencies for the four dithers; the averaging frequency, $f_1$, and two dither frequencies, $f_2, f_3$, are set in the ratio 1:2:3, respectively. For coding schemes required of multiple values, as shown in FIG. 8, the actual dither frequencies can be changed in addition to phase or amplitude offset as long as the ratio relationship is observed. All of these parameters, including dither frequency, dither amplitude, and phase delay are input parameters that can be characterized in the system during calibration and set up directly to be implemented by the microprocessor. Since feedback is not necessary, the coding speed, defined as the time to change from one frequency to another, is not restricted by the capture time; whereas the capture time is required by the closed loop system to settle on the commanded value. FIG. 9 is a schematic diagram illustrating an application of an optical key using in-band signaling. An optical network is depicted wherein mirrors are controlled to produce frequency modulation that is detectable at an output tap without disturbance to the signal embedded in the optical beam.

The invention has been explained with reference to specific embodiments. Other embodiments will be evident to those of skill in the art. It is therefore not intended that the invention be limited, except as indicated in the appended claims

What is claimed is:

1. A method comprising:
   generating a continuous in-band information-carrying signal channel on an optical beam by manipulating two tip-tilt mirrors arranged in series along an optical path of the optical beam for guiding the optical beam while maintaining alignment of the optical beam to a target output optical fiber in such a way as to produce an information-carrying frequency modulated artifact on the optical beam independent of any information-carrying signal channels embedded in the optical beam.

2. The method of claim 1 wherein the frequency modulated artifact is implemented by:
   modulating amplitude of mirror angles of the tip-tilt mirrors to control the level of measured output power, the two tip-tilt mirrors being employed to couple optical power from an input fiber to the target output optical fiber, four mirror axes being actuated to produce a time-varying set of induced mirror angles that yield a desired variation in frequency of variations in optical power level wherein a sequence of signals expressed as time-varying optical power level is used as in-band signaling along an optical channel common with data carried in the optical channel.

3. The method of claim 1 wherein the frequency modulated artifact is implemented by modulating the optical beam at a first dithering amplitude along a first axis orthogonal to a beam path of the optical beam and a second dithering amplitude different from the first dithering amplitude along a second axis orthogonal to the beam path of the optical beam while varying rate of dithering about the beam path.

4. The method of claim 3 comprising:
   employing relative dither amplitude of sine and cosine to generate frequency modulated in-band signals.

5. The method of claim 3 comprising:
   employing phase delay of sine and cosine to generate frequency modulated in-band signals.

6. The method of claim 1 wherein the frequency modulated artifact is effected by offsetting the center of dithering of the optical beam from the optical center of the output optical fiber to achieve a modulated output frequency higher than dithering frequency.

7. An apparatus for modulating an output optical beam comprising:
   an input element for input of an input optical beam having information-carrying signal channels;
   a first tip-tilt mirror in the path of the input optical beam;
   a second tip-tilt mirror in the path of the input optical beam that is reflected as output from the first tip-tilt mirror;
   a target output optical fiber in the path of the reflected optical beam from the second tip-tilt mirror that is reflected as output from the second tip-tilt mirror;
   a controller for manipulating the first tip-tilt mirror and the second tip-tilt mirror for guiding the reflected optical beam while maintaining alignment of the reflected optical beam to the target output optical fiber in such a way as to produce a frequency modulated artifact on the output optical beam independent of any information-carrying signal channels embedded in the optical beam.

8. The apparatus according to claim 7 wherein the frequency modulated artifact is effected by modulating the reflected optical beam at a first dithering amplitude along a first axis orthogonal to the reflected optical beam and a second dithering amplitude different from the first dithering amplitude along a second axis orthogonal to the reflected optical beam while varying rate of dithering about the beam path.

9. The apparatus of claim 8 wherein the controller employs relative dither amplitude of sine and cosine to generate frequency modulated in-band signals.

10. The apparatus of claim 8 wherein the controller employs phase delay of sine and cosine to generate frequency modulated in-band signals.

11. The apparatus of claim 7 wherein the frequency modulated artifact is effected by offsetting the center of dithering of the reflected optical beam from the optical center of the target output optical fiber to achieve a modulated output frequency higher than dithering frequency.

* * * * *

UNITED STATES PATENT AND TRADEMARK OFFICE
CERTIFICATE OF CORRECTION

PATENT NO. : 8,817,359 B2  
APPLICATION NO. : 13/626812  
DATED : August 26, 2014  
INVENTOR(S) : Kelvin Chau Page 1 of 1

It is certified that error appears in the above-identified patent and that said Letters Patent is hereby corrected as shown below:

On the title page, in the left hand column, in item (73) titled ASSIGNEE, delete "Gilmmerglass Networks, Inc., Hayward, CA (US) and insert -- "Glimmerglass Networks, Inc., Hayward, CA (US)" --

Signed and Sealed this
Eleventh Day of November, 2014

Michelle K. Lee
*Deputy Director of the United States Patent and Trademark Office*